C. F. TENNEY & T. J. HOBBS.

Assignors to THOMPSON, PERLEY & WAITE.

Combined Carriage and Chair.

No. 8,166. Reissued April 9, 1878.

Witnesses.

Fred. E. Mills

W. J. Pratt.

Inventor.

Charles F. Tenney

Thomas J. Hobbs by Crosby & Gregory Attys

UNITED STATES PATENT OFFICE.

CHARLES F. TENNEY AND THOMAS J. HOBBS, OF BALDWINSVILLE, MASS., ASSIGNORS TO THOMPSON, PERLEY & WAITE.

IMPROVEMENT IN COMBINED CARRIAGE AND CHAIR.

Specification forming part of Letters Patent No. 164,782, dated June 22, 1875; Reissue No. 8,166, dated April 9, 1878; application filed March 2, 1878.

*To all whom it may concern:*

Be it known that we, CHARLES F. TENNEY and THOMAS J. HOBBS, both of Baldwinsville, in the county of Worcester and State of Massachusetts, have invented an Improvement in Child's Carriage and Chair, of which the following is a specification:

This invention relates to a combined high chair and carriage for children; and consists in the combination, with the seat, of pivoted legs provided with wheels or rollers, whereby the parts may be changed readily from a carriage to a high chair, or vice versa; also, in the combination, with the carriage, of a table or play-board; and, also, in the combination, with the carriage, of a pivoted guard to retain a child in the seat, such guard being provided, or not, with a miniature horse.

Figure 1:
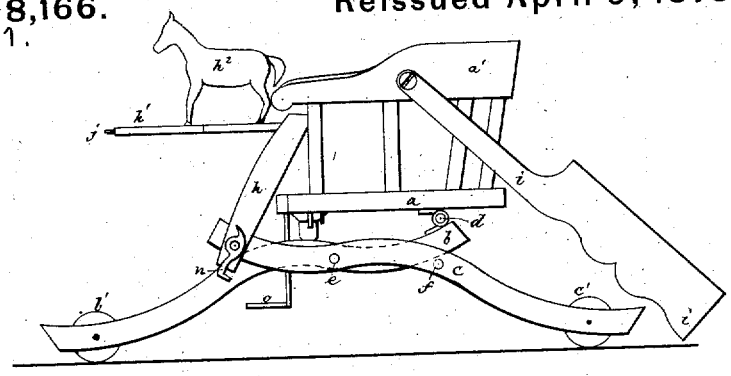
Figure 3:
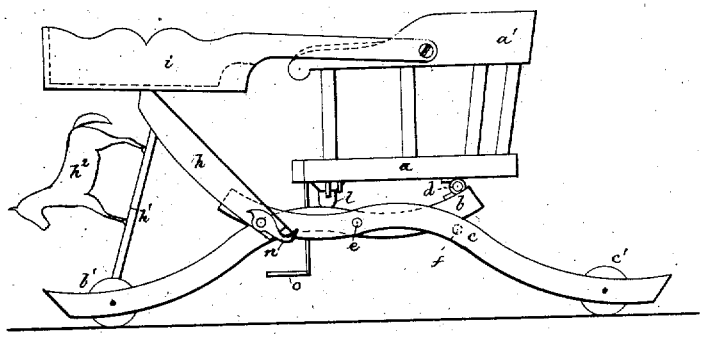
Figure 2:
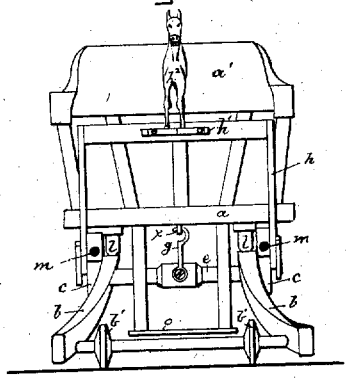

Figure 1 is a side view representing the high chair converted into a carriage; Fig. 2, front view thereof; Fig. 3, a side view of Fig. 1, with the table in front of the lowered seat; and Fig. 4 is a side view representing the parts in position to form a high chair, the table being shown as hanging behind the chair-seat.

The combined high chair and carriage is composed of a seat, *a*, suitable arms and back *a'*, legs *b c*, and wheels or rollers $b^1$ $c'$. The legs *b* are hinged at *d* to the chair-seat *a*, the point of connection between such legs and the seat being at one side (the rear side) of a line drawn centrally through such seat from side to side thereof. The legs *c* are connected with legs *b* by means of a cross-bar or round, *e*, upon which they turn. These legs *c* are further connected together by a cross-bar or round, *f*, which forms a stop to arrest the descent of the legs *b* and the seat, as hereinafter described. Each pair of legs, at or near their lower end, are provided with a cross-bar or axle, and wheels or rollers $b^1$ $c'$.

Figure 4:
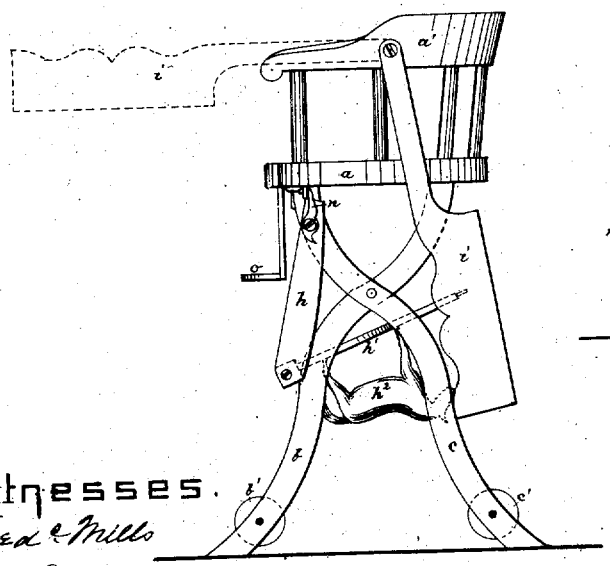

When used as a high chair the legs *b c* are brought together, as shown in Fig. 4, to elevate the seat *a*, and the lower ends of the legs *b c* rest upon, and the wheels are elevated from, the floor. In such position the upper ends of legs *c* are made available to support the seat at a point on the opposite side of the central line before referred to, at which the legs *b* were hinged to the seat, and the pins *l* upon the seat enter the holes *m* in the ends of the legs *c*, and holding devices (shown as hooks *n*) engage eyes attached to the seat, thereby firmly holding the seat in its most elevated position, and the legs in nearly vertical positions.

The table or play-shelf *i* is pivoted or connected with the rails or arm *a'* of the seat, or other suitable part, so that the table may be placed in front of the seat, or, when not in use as a table or play-shelf, may be swung over or moved to the back of the seat, as shown in Figs. 1 and 4. This table may be used to receive toys, or as a table for food, or other purposes.

In Fig. 1 the seat *a* is shown lowered from the position shown in Fig. 4, so as to form a carriage. To convert the high chair into a carriage, the holding devices, holding the hinged legs fixedly with relation to the seat, (the devices *n*,) are disengaged, the seat is lowered, the lower ends of the legs expand, (such lower ends extend beyond the back and front of the seat,) and in so doing the rollers $b^1$ $c'$ come in contact with the floor, permitting the chair thereafter to be rolled about and form a carriage.

It will be observed that the same legs sustain the seat in its elevated and lowered positions. When the seat arrives at the proper level to form a carriage, the seat and legs *b* meet the round *f* or stop, which arrests the further descent of the seat and legs, and then the legs are locked in such position by a hook, *g*, on the cross-bar *e*, which engages an eye, *x*, upon the seat. (See Fig. 2.)

Pivoted to legs *c* is a guard, *h*, which may be thrown into the position shown in Fig. 1 to retain the child in position in the seat. This guard is so pivoted that downward pressure on its cross-bar will cause it to move toward the seat, and projecting forward from the cross-bar of the guard is a leaf, $h^1$, on which is placed a miniature horse, $h^2$, and in this condition the child will seemingly have a horse to drive, and this miniature horse may have connected with it reins, and strain on the reins will draw the guard back.

A person moving the carriage may use the table or shelf as a handle; or, if the carriage is left stationary in the house, the shelf may be kept in a horizontal position, or nearly so, by means of a brace extending from the shelf to the legs *c*, and then the table may be used as a work-table, and the child be kept constantly in view.

If desired, the guard *h* may be thrown forward, as shown in Fig. 3, and the table *i* turned forward and be allowed to rest on the guard. In this position the projections *j* on the leaf *h* enter holes in the axle $b^2$, forming a brace. The table *i* can then be turned back and the child be placed up to an ordinary table; or, if preferred, the table *i* may rest on an ordinary table, or be properly supported in front of the child for dining or other purposes. The seat is provided with a foot-rest, *o*.

I claim—

1. As an improved article of manufacture, a child's chair convertible into a high chair or carriage, it being provided with a pair of hinged legs, and rollers carried by and movable with the legs, the rollers being adapted to bear upon the floor when the seat is lowered, to thereby form a carriage, substantially as described.

2. A child's-chair seat, combined with rollers and seat-supporting legs, connected with such seat and with each other, and a foot-rest so attached as to permit the legs to be extended more or less at the front and rear of the seat, to convert the chair into a high chair or carriage, substantially as described.

3. In a child's chair convertible into a high chair or carriage at will, the combination of a seat and a pair of hinged roller-carrying legs, connected with the frame of the seat, the legs, by their change of position with reference to the seat, enabling the seat to be elevated to form a high chair for use with a dining-table of usual height, and to lower the seat for a carriage, the same set of legs serving to sustain the seat in both its elevated and lowered position.

4. The combination, with a chair seat and legs hinged to the seat-frame, of rollers placed near the ends of the legs to permit the ends of the legs to rest upon the floor when the seat is elevated, and the rollers to bear upon the floor when the seat is lowered, by changing the position of the legs with relation to the horizontal portion of the seat.

5. The combination, with the seat and arms of a child's chair, of a table connected therewith, and adapted to be turned backward over the back of the seat when not in use as a table.

6. In a child's high chair and carriage, the combination of a seat-frame, hinged legs and rollers, and a holding device, to hold the upper ends of the legs fixed with relation to the seat when in its elevated position as a high chair, the disengagement of the holding devices permitting the legs to turn on the connection joining them with the seat, to thereby permit the high chair to be used as a carriage.

7. In a combined child's high chair and carriage, rigidly-connected seat, arms, and back, combined with hinged legs and rollers, and a foot-rest and table, adapted to be placed in front of the seat when in use, and to be suspended at the back of the seat when not in use, substantially as described.

8. A combined child's high chair and carriage, provided with pivoted roller-carrying legs, adapted to be extended in front and behind the seat as the latter is lowered to form a carriage, and with a stop to check the outward spreading of the legs, to thereby retain the lowered seat at the desired level to form a carriage, substantially as described.

9. In a child's high chair and carriage, the combination of legs hinged to the seat-frame at one side of a line drawn laterally through the center of the seat-frame, such legs supporting the seat in its high and low positions, and a holding device to connect such hinged legs with the seat-frame at a point at the opposite side of such central line, to hold such hinged legs in proper position to firmly support the seat each side such central line.

10. A child's carriage composed of a seat, *a a'*, legs *b*, connected with the seat, legs *c*, pivoted to legs *b*, and wheels, all combined to operate substantially as described, and to be converted into a high chair, as set forth.

11. The combination, with the seat and its hinged legs *b*, of the legs *c*, pivoted to legs *b*, and the pivoted guard connected with legs *c*, as described, whereby downward pressure on the guard throws it back against the seat, substantially as described.

CHARLES F. TENNEY.
THOMAS J. HOBBS.

Witnesses:
JOHN F. GREEN,
WM. HOLDEN.